United States Patent [19]

Aihara et al.

[11] Patent Number: 4,602,339

[45] Date of Patent: Jul. 22, 1986

[54] METHOD OF MANUFACTURING MASTER-SLICE INTEGRATED CIRCUIT DEVICE

[75] Inventors: Satoshi Aihara, Sagamihara; Tetsu Tanizawa, Kawasaki, both of Japan

[73] Assignee: Fujitsu Limited, Kawasaki, Japan

[21] Appl. No.: 535,832

[22] Filed: Sep. 26, 1983

[30] Foreign Application Priority Data

Sep. 30, 1982 [JP] Japan .................... 57-172167

[51] Int. Cl.[4] ............ H01L 27/02; G06F 15/60
[52] U.S. Cl. ............................ 364/490; 357/40; 364/491
[58] Field of Search ............ 364/481, 488, 489, 490, 364/491; 357/40, 45

[56] References Cited

U.S. PATENT DOCUMENTS 4,295,149  10/1981  Balyoz et al. ............... 357/40 X
4,484,292  11/1984  Hong et al. .................. 364/491
4,500,906   2/1985  Ohno et al. ................. 357/40 X

FOREIGN PATENT DOCUMENTS 0005723  12/1979  European Pat. Off. ......... 364/491
0021661   1/1981  European Pat. Off. ......... 364/491
2442850   4/1975  Fed. Rep. of Germany ...... 364/491

OTHER PUBLICATIONS

Journal of Digital Systems, "Channel-Order Router-A New Routing Technique for a Masterslice LSI", Kanada et al., vol. IV, Issue 4, pp. 427-441.
Computer Design, "Custom ICS From Standard Cells: A Design Approach", William Loesch, May 1982, pp. 227-234.
Electronic Design, "Software Logic Cells-Fast, Low-Cost Solution for Custom LSI", vol. 29 (1981), No. 26, pp. 119-124.
E. D. N. Electrical Designs News, "Automated Design and Simulation Aids Speed Semicustom-IC Development", vol. 27, Aug. 1982, No. 15, pp. 35-48.
International Electronics, "CAD Toolbox Holds all Gear for the Design of Custom Logic Arrays", Blood, vol. 54, Sep. 8, 1981, No. 18, pp. 140-142.
Computer, "LSI/VLSI Design Automation", Raymond, vol. 14, Jul. 1981, No. 7, pp. 89-101.

*Primary Examiner*—Felix D. Gruber
*Assistant Examiner*—Heather R. Herndon
*Attorney, Agent, or Firm*—Staas & Halsey

[57] ABSTRACT

A method of manufacturing a master-slice integrated circuit device, implemented based on a total circuit diagram, including one or more logic blocks, each including a plurality of basic logic blocks such as flip-flops, NAND gates, and the like. The total circuit diagram is reformed by deleting unused basic logic blocks in each of the logic blocks whose output terminals are not used, by deleting unused wirings and other unused basic logic blocks whose output terminals are not connected to any basic logic blocks as a result of the deletion of the basic logic blocks, and by sequentially deleting unused basic logic blocks and unused wirings in the same manner, so as to retain only those basic logic blocks actually used as effective basic logic blocks. The circuit patterns of the master slice integrated circuit device are produced by using the total circuit diagram thus reformed.

2 Claims, 12 Drawing Figures

METHOD OF MANUFACTURING MASTER-SLICE INTEGRATED CIRCUIT DEVICE

CROSS-REFERENCE TO RELATED APPLICATION

This application is cross-referenced to U.S. application Ser. No. 477,751, filed Mar. 22, 1983.

BACKGROUND OF THE INVENTION (1) Field of the Invention

The present invention relates to a method of manufacturing a master-slice integrated circuit device, and more particularly to a method of designing circuit patterns, i.e., the mask patterns for master-slice integrated circuit devices such as a gate array LSI device. The circuit patterns are designed from a block circuit diagram by using logic blocks, each of which includes a plurality of basic logic blocks.

(2) Description of the Prior Art

The mask patterns for a gate-array LSI device are made from a logic circuit designed by the customer using basic logic blocks, such as basic cells in a logic block family, consisting of various gate circuits and the like. Information on the logic block family is supplied to the customer by the LSI manufacturer. In certain cases, such as when many different kinds of gate array LSI's are manufactured, circuits with structures partially common to each other are often used. In such cases, it is generally possible to define a common portion that includes a plurality of basic logic blocks as a logic block such as, for example, a macro cell, and to thereby simplify the design work of the gate array LSI's.

In conventional methods for manufacturing master-slice integrated circuit devices, however, since it is impossible to use part of the basic logic blocks forming a logic block, it has been necessary to define logic blocks as different logic blocks even when the circuits of the logic blocks differ only slightly from each other. For example, when it is necessary to use counter circuits having different bit numbers, such as two-bit counters, three-bit counters, four-bit counters, and so on, separate logic blocks have to be defined for all counters having different bit numbers. In this type of method, therefore, the number of different kinds of logic blocks becomes relatively large. Because many libraries of these logic blocks must be registered in a computer, the memory capacity of the computer has to be enlarged, the processing time for computational processes in design automation (DA) extended, and the memory capacity of the working areas enlarged. Moreover, artificial errors increase when the libraries of the logic blocks are registered in the computer, in addition to which the reliability of the gate array LSI's deteriorates.

SUMMARY OF THE INVENTION

In order to solve the above-mentioned problems of the conventional method, the present invention adopts the partial use of logic blocks, in a method of manufacturing a master-slice integrated circuit device, for designing circuit patterns.

It is an object of the present invention to greatly decrease the number of logic blocks in a logic block family so as to lessen the demand on the memory capacity of the computer, and decrease the processing time.

It is another object of the present invention to decrease the time required for registering the logic block libraries in the computer, thereby preventing the deterioration in reliability of an IC device due to artificial errors.

According to the present invention, this object is attained by providing a method of manufacturing a master-slice integrated circuit device, wherein a total circuit diagram is made by using at least one logic block, said block or blocks including a plurality of basic logic blocks. The total circuit diagram is changed by deleting a number of basic logic blocks from each of the logic blocks, and by deleting unused wirings. In this way, the only basic logic blocks retained are those which are used in practice as effective basic logic blocks. The circuit patterns of the master slice integrated circuit device are produced by using this reformed total circuit diagram.

DESCRIPTION OF THE PREFERRED EMBODIMENTS

Before describing embodiments of the present invention, a conventional method is explained with reference to the drawings.

Figure 1:
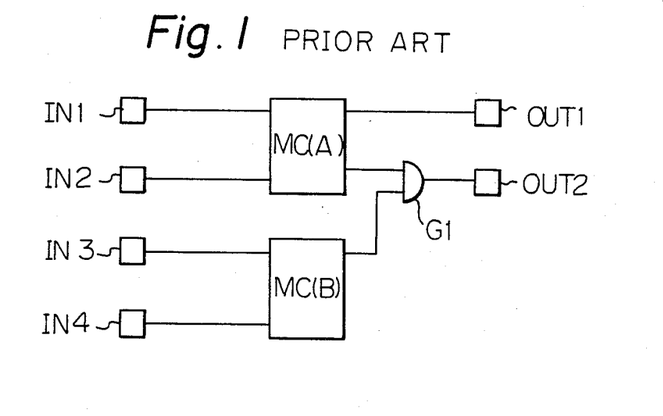
FIG. 1 is a block circuit diagram used for implementing the conventional method.
Figure 2A:
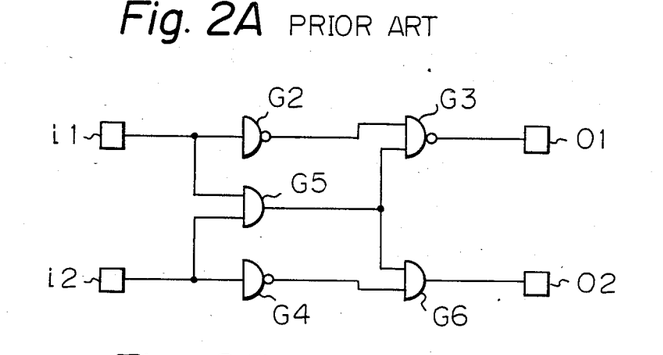
FIGS. 2A and 2B are internal circuit diagrams of the structure of a logic block used in the circuit of FIG. 1.
Figure 2B:
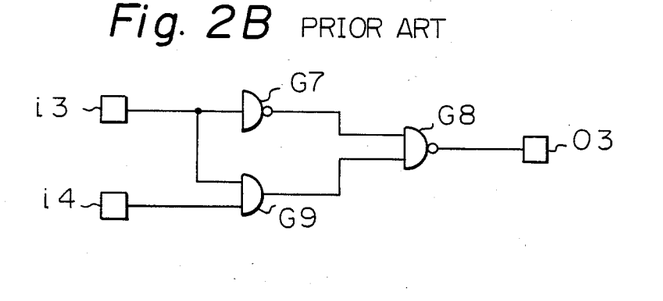

FIG. 1 is a block circuit diagram formed by using logic blocks and designed by using a conventional method. In FIG. 1, IN1 through IN4 designate input terminals, OUT1 and OUT2 designate output terminals, MC(A) and MC(B) are logic blocks, and G1 is an AND gate. In a block circuit diagram of FIG. 1, logic blocks MC(A) and MC(B) have the structures shown in FIGS. 2A and 2B, respectively. As illustrated in FIG. 2A, the logic block MC(A) consists of, for example, three NAND gates G2, G3 and G4, and two AND gates G5 and G6. Reference codes i1 and i2 are input terminals of the logic block, and O1 and O2 are output terminals of the logic block. As illustrated in FIG. 2B, the logic block MC(B) of FIG. 1 consists of an inverting gate G7, a NAND gate G8, and an AND gate G9. In FIG. 2B, i3 and i4 designate input terminals of the logic block, and O3 designates an output terminal of the logic block, in a manner similar to FIG. 2A. By defining the logic blocks as illustrated in FIGS. 2A and 2B, it is possible for customers to design logic circuits as block circuits like that shown in FIG. 1, when many kinds of gate array LSI's and so on, are designed. It is therefore not necessary to develop a circuit diagram of the basic logic block level, thus simplifying the design work and preventing errors in the design work. The logic blocks may be used not only when many kinds of LSI's are designed but also when an LSI has a circuit design which comprises a plurality of partially common circuit portions. Each common part of the partially common circuit portions is designed by using a logic block, thereby simplifying the design work in a manner similar to the above case.

However, the conventional method has the aforementioned drawbacks.

Figure 3:
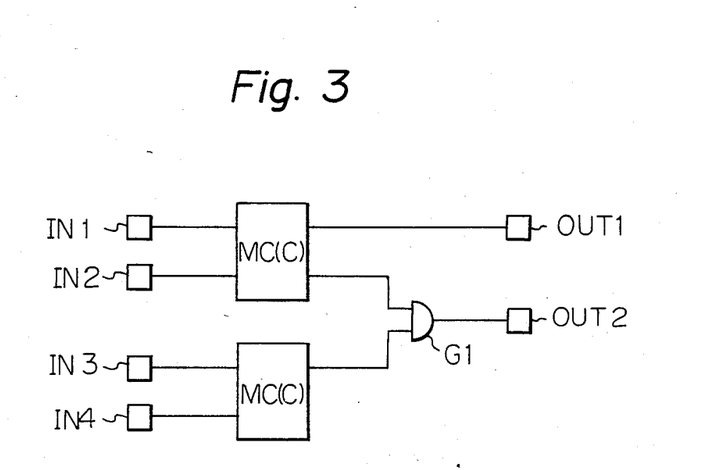
FIG. 3 is a block circuit diagram used for implementing the method according to the present invention.

Embodiments of the present invention will now be described with reference to the drawings. FIG. 3 is an example of a block circuit diagram used when one embodiment of the method of the present invention is carried out. In FIG. 3, IN1 through IN4 designate input terminals, OUT1 and OUT2 are output terminals, G1 is an AND gate, and MC(C) is a logic block.

In the block circuit diagram of FIG. 3, the same two logic blocks MC(C) are used in the circuit diagram. The logic block MC(C) has the structure shown in FIG. 4, which is the same as that shown in FIG. 2A. The logic circuit represented by the block circuit diagram of FIG. 3 is thus quite similar to the logic circuit represented by the block circuit diagram of FIG. 1. However, it should be noted that, in the block circuit diagram of FIG. 3, the logic circuit is represented by using one kind of logic block MC(C). In the block circuit diagram of FIG. 3, only one of the output terminals O1 is used; the other output terminal O2 is not used in the macro cell MC(C) connected to input terminals IN3 and IN4.

Figure 4:
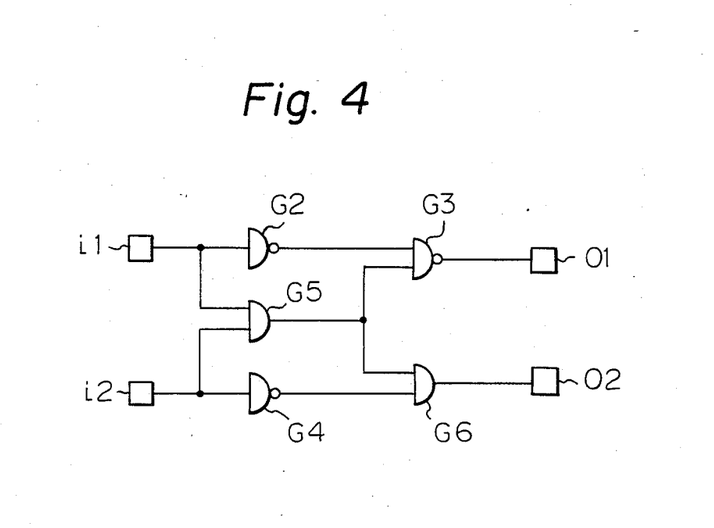
FIG. 4 is an inner circuit diagram of the structure of a logic block used in the block circuit diagram of FIG. 3.

In the method according to the present invention, the gate G6, connected to unused output terminal O2, is deleted, and, gate G4, whose output terminal becomes open by the deletion of gate G6, is deleted. The present invention makes it possible to partially utilize each logic block by incorporating the deletion of unused basic logic blocks and unused wirings into the DA process.

Figure 5:
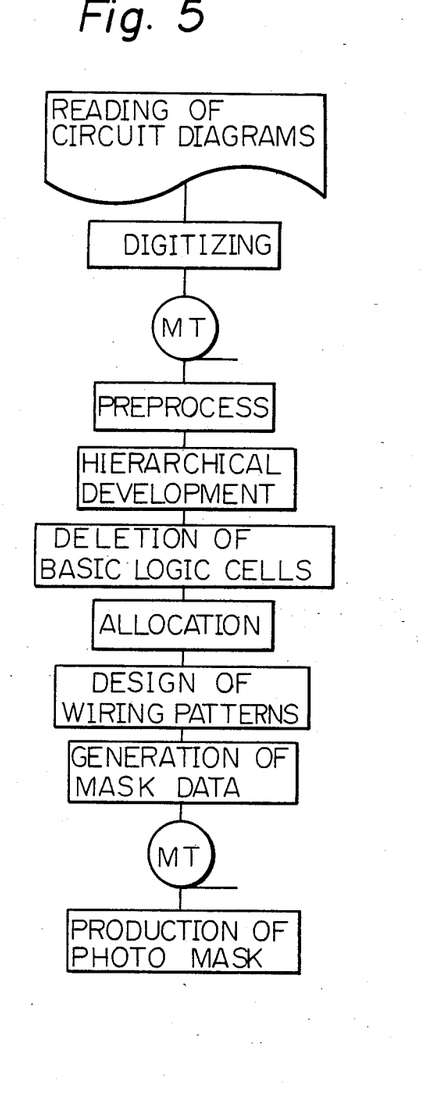
FIG. 5 is a flow chart of a process for implementing the method according to the present invention.

FIG. 5 is a processing sequence for the case in which an embodiment of the method of the present invention is implemented. As shown in FIG. 5, the block circuit diagram made in the above-mentioned manner and the circuit diagrams showing the structures of the logic blocks are read in by means of, for example, an optical scanner, the contents of these circuit diagrams are converted to digital codes by a digitizer, and these codes are stored on a magnetic tape.

At the preprocessing stage, logic information is extracted from the digital codes stored on the magnetic tape. The logic information includes, for example, information on the kinds of basic logic blocks and the kinds of logic blocks included in the circuit diagram, as well as wiring information on terminal connections in each of the basic logic blocks and the logic blocks. It should be noted that it is possible to input logic information into a computer system directly from a keyboard in a special-purpose computer language.

Next, the logic information is developed into lower order circuit information, i.e., information having the lower hierarchy. The logic information is in this way converted into circuit information for the basic logic blocks. That is, the logic information for each of the logic blocks is replaced by circuit information having the basic logic block level, thereby representing all the logic circuits with basic logic blocks.

Circuit information for the unused basic logic blocks and wirings is then deleted sequentially from the output terminal side back to the input terminal side. That is, basic logic blocks whose output terminals are not connected to any other circuit are detected and deleted from participating in a DA process. Other unused basic logic blocks whose output terminals are not connected to any other circuit as a result of this deletion are also deleted. Unused basic logic blocks are sequentially deleted in a similar manner. That is, the unused basic logic blocks and the unused terminals are deleted from the logic circuit before it is developed into an actual pattern. In this way, only circuit information for basic logic blocks actually used is obtained. If necessary, a detailed circuit diagram, i.e., a diagram of the total circuit structure, including only basic logic blocks actually used, is shown on a display device and stored on a magnetic tape.

Then allocation of each basic logic block in the detailed circuit diagram to the basic cell elements on a gate array LSI chip, i.e., the disposition of each basic logic block, is then determined, and wirings to connect the basic cell elements are determined from the detailed circuit diagram information obtained by the above-mentioned process. Mask data for making mask patterns is generated and stored on a magnetic tape based on the information on the disposition and the wirings of these basic logic blocks. A mask pattern generating apparatus uses the mask data recorded on the magnetic tape to make practical mask patterns, in a known manner.

Figure 6:
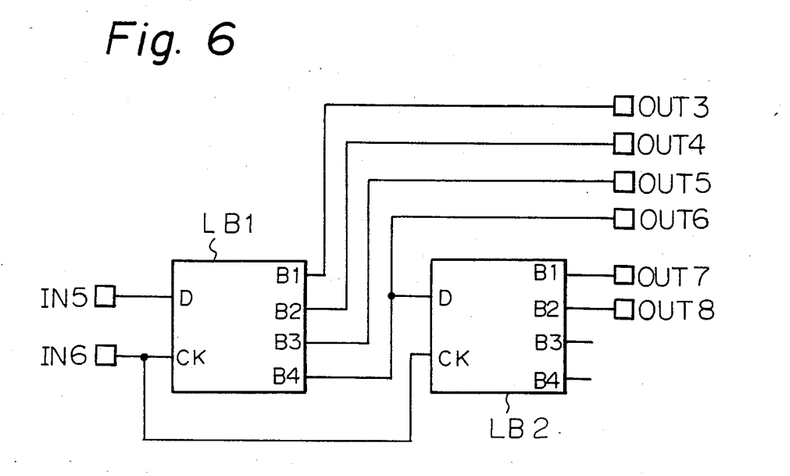
FIG. 6 is a diagram of another block circuit diagram used for implementing the method according to the present invention.

FIG. 6 is another example of a block circuit diagram designed using logic blocks. The block circuit diagram includes two logic blocks LB1 and LB2 which construct a six stage shift register. Each of the logic blocks LB1 and LB2 is a four stage shift register and comprises four D-type flip-flops comprising basic logic blocks CM1, and CM2, CM3 and CM4, and two inverters comprising basic logic blocks CM5 and CM6.

Figure 7:
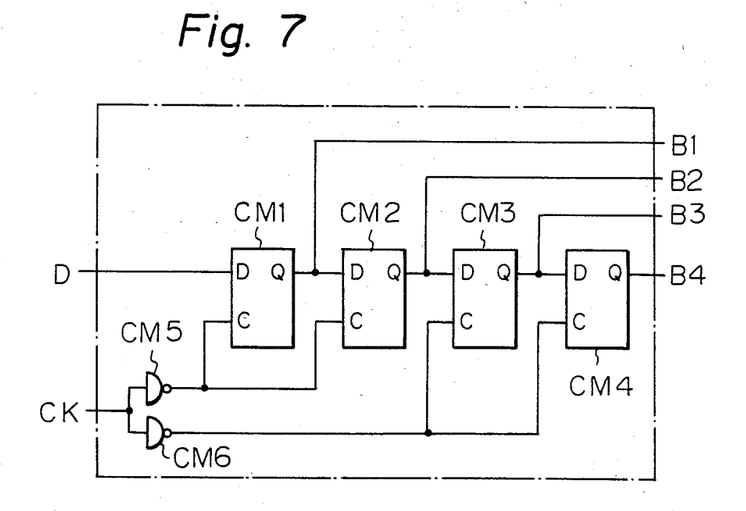
FIG. 7 is an inner circuit diagram of the structure of a logic block used in the block circuit diagram of FIG. 6.

After the aforementioned preprocessing stage in the process of FIG. 5, the logic information for the circuits shown in FIGS. 6 and 7 are obtained.

Figure 8:
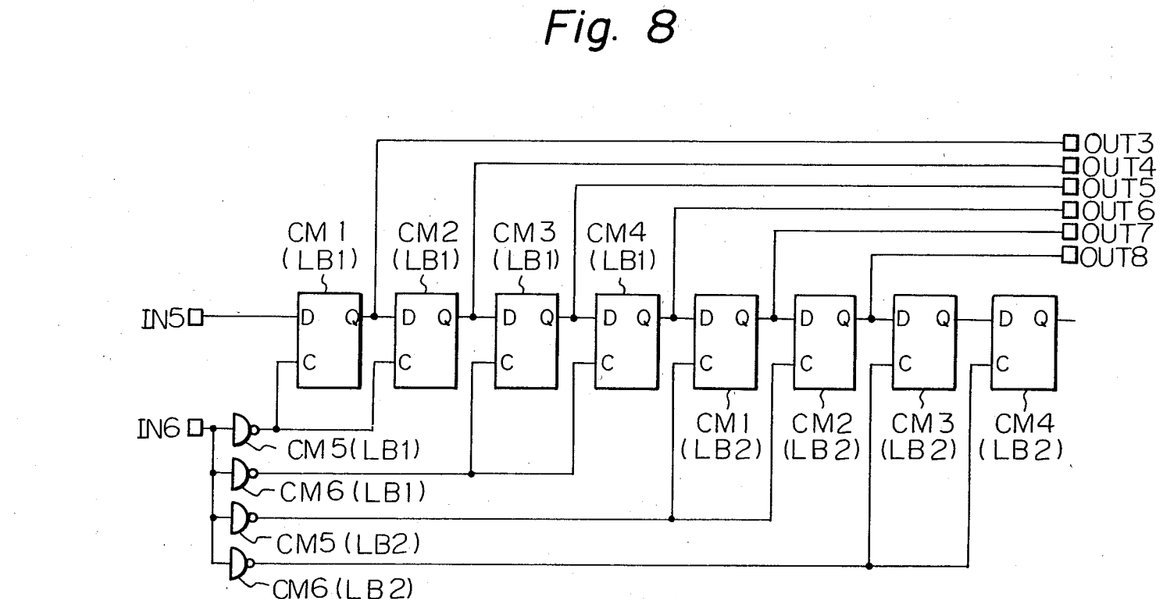
FIG. 8 is a block circuit diagram obtained by hierarchical development in the method according to the present invention.

FIG. 8 is a block circuit which is obtained after hierarchical development is effected by using the logic information for the circuits of FIGS. 6 and 7. In FIG. 8, each reference symbol includes information for a logic block and a basic logic block. For example, a reference symbol CM1(LB1) means the basic logic block CM1 of the logic block LB1.

Figure 9:
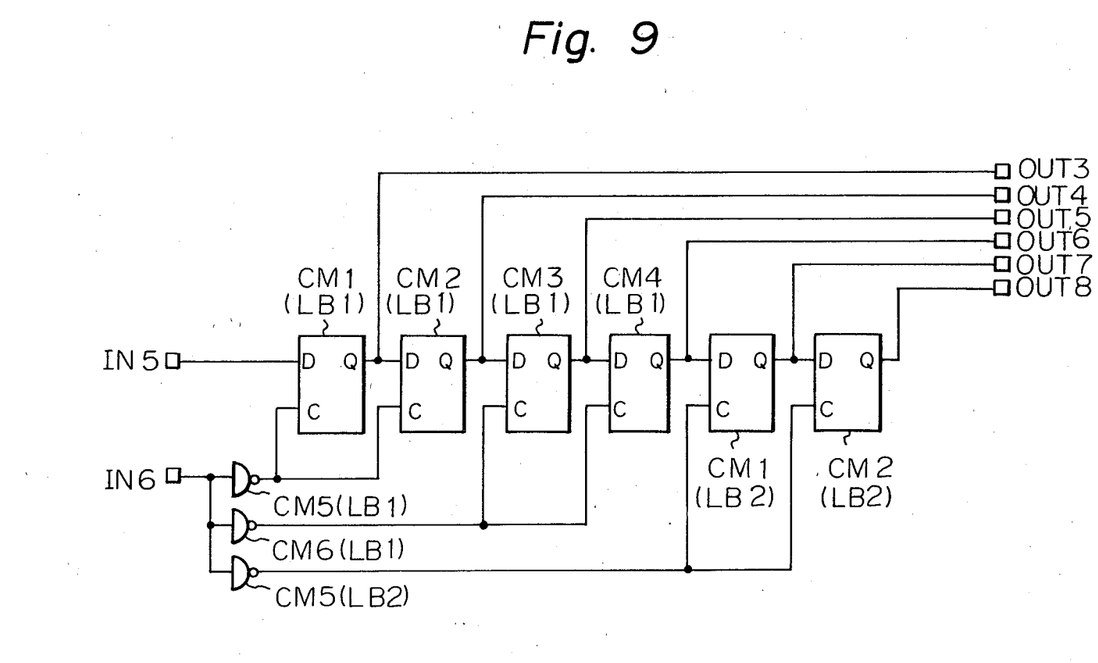
FIG. 9 is a block circuit diagram obtained after the deletion of unused basic logic blocks.

FIG. 9 is a block circuit obtained after unused basic logic blocks and unused wirings are deleted. For example, the basic logic blocks CM3(LB2), CM4(LB2), and CM6(LB2), and wirings connecting the output of the basic logic block CM6(LB2) to the clock inputs of the basic logic blocks CM3(LB2) and CM4(LB2), and so on are deleted. Mask patterns are therefore formed by using the circuit information corresponding to the circuit of FIG. 9.

Figure 10A:
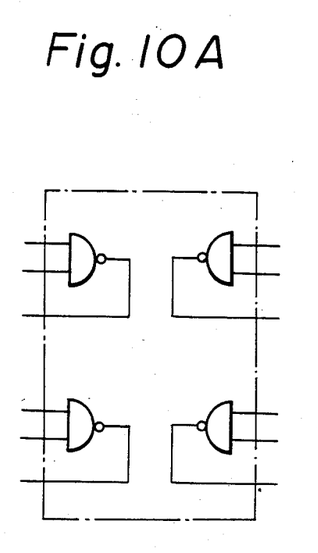
FIGS. 10A and 10B are inner circuit diagrams of other logic blocks used for implementing the method according to the present invention.
Figure 10B:
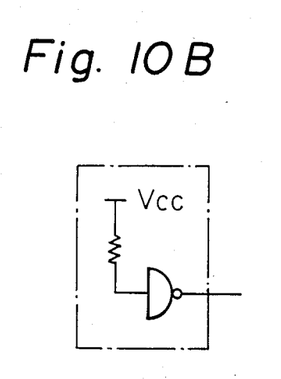

FIGS. 10A and 10B are other examples of logic blocks to which the method according to the present invention is adaptable. The logic block of FIG. 10A comprises four NAND gates and has the same circuit structure as that of a standard 7400 type quad two input NAND gate IC device. According to the present invention, it is possible to include standard IC devices, such as 74 series IC devices, in a logic block family. The logic block of FIG. 10B is a stack cell which is used to output a predetermined logical level signal, such a low level signal. The stack cell of FIG. 10B can be included in the logic block of FIG. 10A. It should be noted that, according to the present invention, if the stack cell and/or some NAND gates are not actually used in a block circuit diagram designed by a customer, for example, they are automatically deleted. Therefore, unused logic blocks are not allocated in a chip of a gate array LSI.

As mentioned above, according to the present invention, it is possible to generate a block circuit diagram for making mask patterns by using logic blocks, and to partially use each logic block, so as to enable a great decrease in the kind of logic blocks employed. The capacity of the memory device for registering libraries of logic blocks can in this way be decreased, and the execution time required for computation in the design automation process can be decreased. According to the present invention, it is also possible to greatly simplify the manual work required to register the libraries of the logic blocks in a computer and to thereby prevent the generation of defective LSI and the deterioration in reliability caused by manual operation.

We claim:

1. A method of manufacturing a master-slice integrated circuit device employing a total circuit diagram to produce mask patterns for forming the master-slice integrated circuit device, comprising the steps of:
   (a) employing at least one logic block to produce mask patterns, the at least one logic block including a plurality of basic logic blocks each including circuit elements, and having output terminals;
   (b) breaking down, in sequential order, each of the logic blocks included in the total circuit diagram into a plurality of basic logic blocks;
   (c) reforming the total circuit diagram by deleting unused basic logic blocks, whose output terminals are not used, from the basic logic blocks in each of the logic blocks;
   (d) deleting unused wirings and other unused basic logic blocks whose output terminals are not connected to any basic logic blocks as a result of the deletion of the basic logic blocks in said step c; and
   (e) producing the mask patterns for forming the master-slice integrated circuit device in accordance with the total circuit diagram thus reformed, said step (e) comprising the substeps of:
      (i) allocating the circuit elements of each of the basic logic blocks; and
      (ii) producing the mask patterns by using mask data prepared from information regarding the allocation of the circuit elements of each of the basic logic blocks and on the wirings between the circuit elements.

2. A method of manufacturing a master-slice integrated circuit device including logic blocks of one type having logic information stored therein and having wirings interconnecting the logic blocks, comprising the steps of:
   (a) transforming the logic information into lower order circuit information for representing the logic blocks as basic logic blocks, the basic logic blocks having output terminals;
   (b) connecting the basic logic blocks to form a circuit for performing a desired operation;
   (c) deleting circuit information corresponding to the basic logic blocks and wirings that are unused; and
   (d) deleting unused basic logic blocks whose output terminals are not connected to other basic blocks as a result of deleting the basic logic blocks and wirings in said step (c).

* * * * *